UNITED STATES PATENT OFFICE.

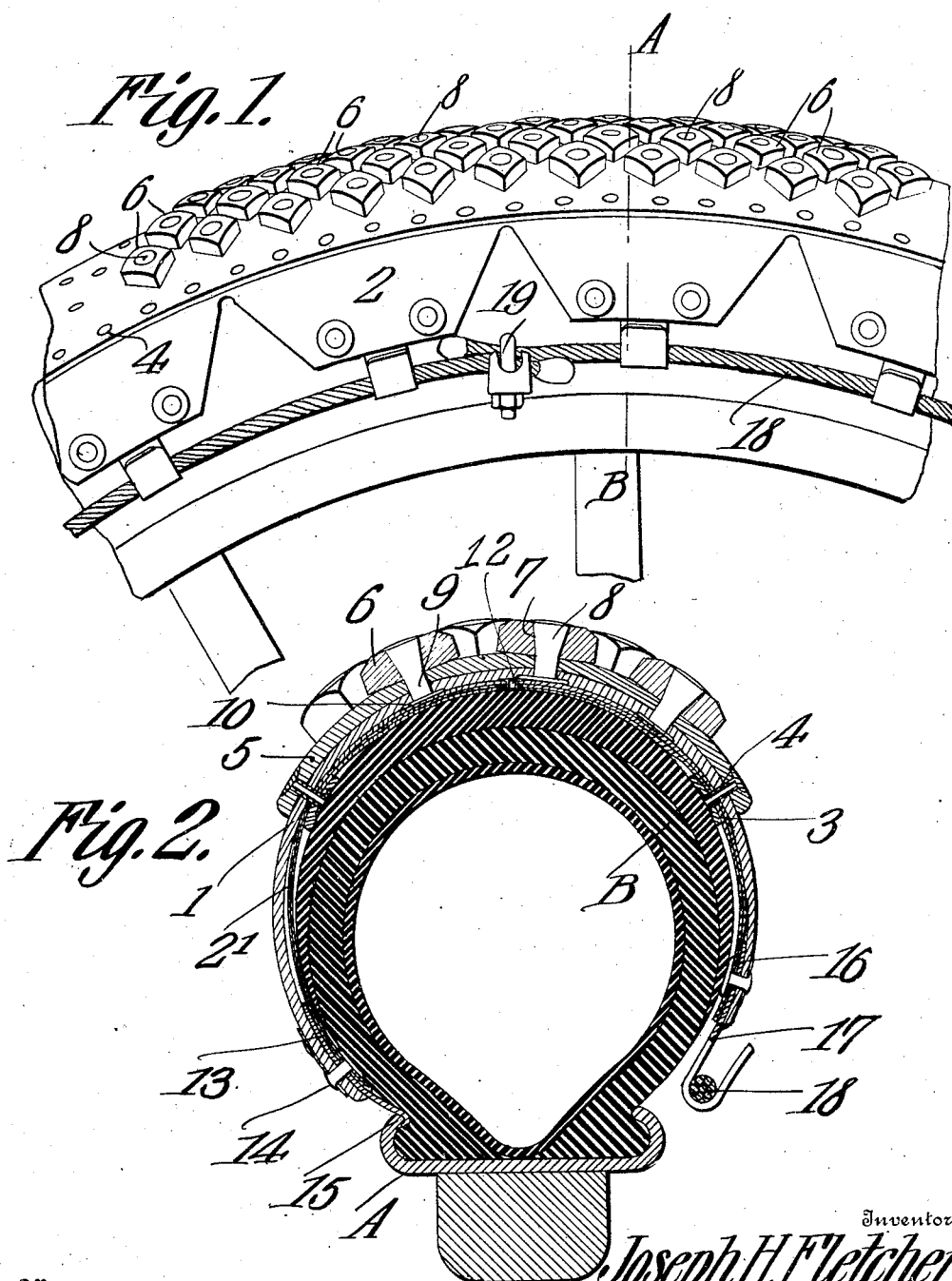

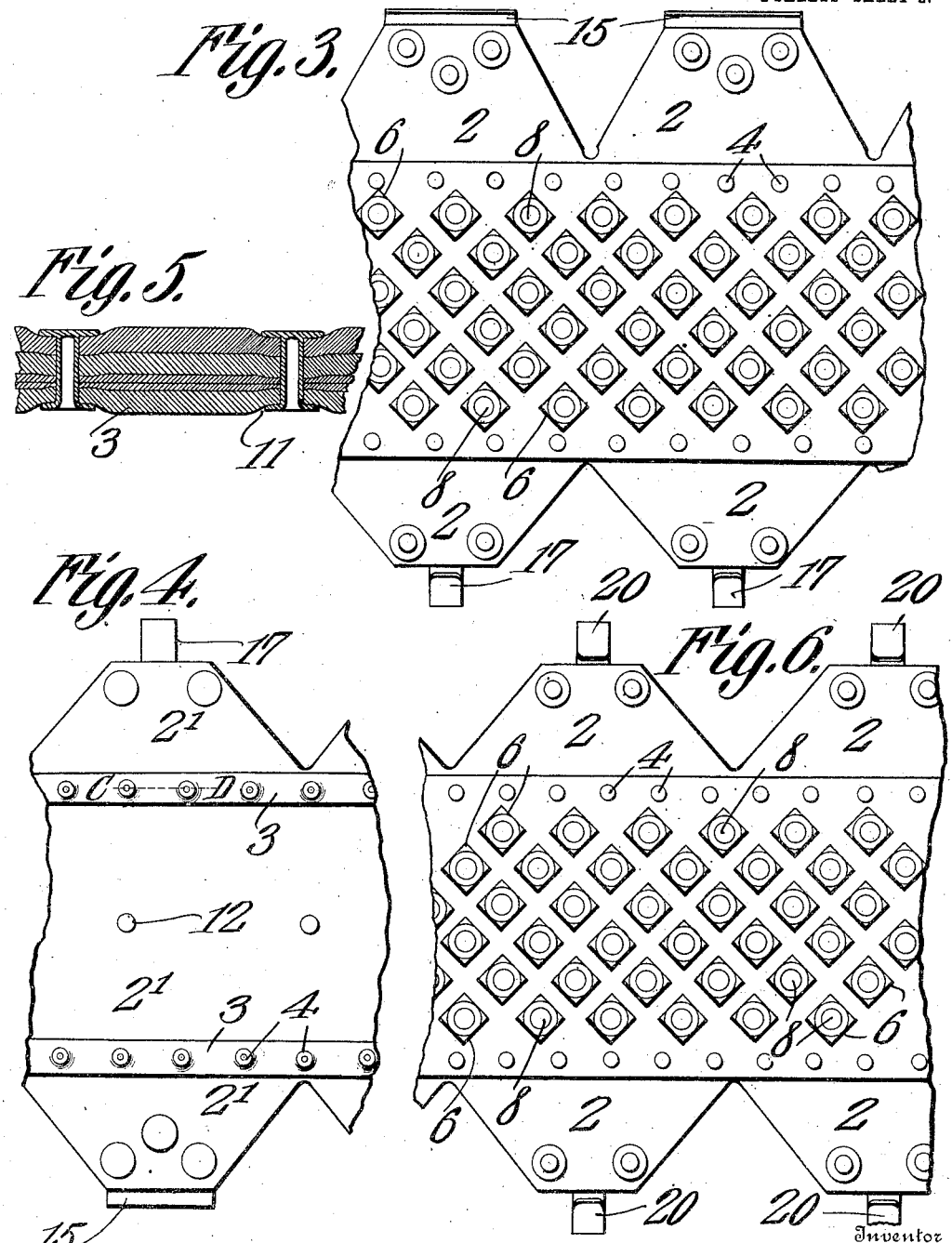

JOSEPH H. FLETCHER, OF SEATTLE, WASHINGTON.

TIRE-SHIELD.

No. 929,203.  Specification of Letters Patent.  Patented July 27, 1909.

Application filed August 10, 1908. Serial No. 447,848.

*To all whom it may concern:*

Be it known that I, JOSEPH H. FLETCHER, a citizen of the United States, residing at Seattle, in the county of King and State of Washington, have invented a new and useful Tire-Shield, of which the following is a specification.

This invention relates to detachable shields or treads for pneumatic tires and its object is to provide a simple, durable, and efficient device of this character which can be readily attached to or removed from a wheel and tire, said device being designed for use in connection with clencher or other forms of pneumatic tires.

Another object is to provide a composite tread or shield made up of bands of leather and fabric so connected as to prevent injury to the tire either from puncture or abrasion.

Another object is to provide novel means upon the tread for preventing the tire or wheel from skidding or slipping, said means being so fastened to the tread as to be securely retained thereon no matter to what extent they may be worn as a result of use.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of a portion of a tire showing the tread applied thereto. Fig. 2 is a section on line A—B, Fig. 1. Fig. 3 is a plan view of a portion of the tread or shield shown in Fig. 1. Fig. 4 is a plan view of the inner surface of a portion of said shield. Fig. 5 is an enlarged section on line C—D, Fig. 4. Fig. 6 is a view similar to Fig. 3 and showing a slightly modified form of shield.

Referring to the figures by characters of reference, A designates the clencher rim of a wheel and B designates a pneumatic tire engaging the same. The shield or tread used for protecting the tire consists of a band 1 preferably of leather and provided along its edges with wings 2 the adjoining edges of which are cut off diagonally so that said wings can be caused to lie snugly against the side portions of the tire. A similar band 2' preferably formed of heavy canvas or other fabrics is arranged under the band 1 and preferably consists of several folds of fabric shaped so as to constitute a lining for the band 1 and also for the wings 2. Retaining strips 3 of leather are arranged upon the inner surface of the lining 2' and under opposite side portions of the band 1. These strips are engaged by the inner heads of rivets 4 extending through the bands 1 and 2' and also through an outer band preferably formed of heavy leather and which is engaged by the outer heads of the rivets 4. These rivets, as indicated in Fig. 1, are disposed at regular intervals and extend throughout the diameter of the shield.

Rectangular studs 6 are arranged upon the outer surface of the band 5 and along diagonal lines and each of these studs has a tapered bore 7 engaged by the frusto-conical head 8 of a rivet 9. These rivets extend through the bands 1 and 5 and the inner heads 10 are lapped and concealed by the lining 2'. It will be apparent therefore that the heads 8 will serve to retain the studs upon the band 5 no matter to what extent they may be worn. As shown particularly in Fig. 5 each strip 3 has the inner heads of rivets 4 pressed thereinto or seated within countersinks 11 so that the heads are thus held out of contact with the tire B and can not abrade or otherwise injure it. A plurality of rivets 12 are secured within the folds of the lining 2 along the center thereof for the purpose of fastening the folds together.

Secured between the wings 2 and the lining 2' at one side of the shield are plates 13 fastened in place by means of rivets 14 or in any other preferred manner and extending beyond the wings and terminating in hooked flanges 15 designed to engage one side of the clencher rim A. Plates 16 are secured between the wings and their linings at the other side of the shield and each of these plates has a hook 17 extending from it and beyond the wings. The hooks are designed to be engaged by a rope or cable 18, the ends of which lap and are adjustably secured by means of a suitable clamp 19.

A shield such as above described is designed particularly for use upon clencher tires. It is to be understood, however, that where no clencher rims are utilized hooks 20 similar to the hooks 17 can be secured to the wings at both sides of the shield as indicated in Fig. 6. With this construction a separate cable or binding device is provided at each side of the wheel for each set of hooks.

In applying the shield to a clencher tire the hooked flanges 15 are first placed into engagement with the rim A as shown in Fig. 2, after which the shield is placed over the tire and the binding rope or cable 18 is placed in the hooks 17 and drawn taut and secured by means of clamp 19. The shield will thus be firmly clamped upon the tire. It will be seen that there are no projections upon the inner surface of the shield and engaging the tire which would tend to abrade or otherwise mutilate the tire. The rivet heads 10 are kept out of contact with the tire by means of the lining 2' and the inner surface of the rivets 4 are arranged within depressions so that they do not contact with the tire. The rivets 14 have their inner heads rounded so that they will not injure the surface of the tire and this is especially unlikely because these heads are not pressed to any extent against the tire.

Importance is attached to the particular arrangement of the studs 6 and the means utilized for fastening them in position. As heretofore stated by providing the tapered rivets 8 the studs can wear down any distance without becoming loose. It will be noted that the studs are arranged so that their sides extend along diagonal lines. Some of the corners of the studs 6 are extended in the direction of travel of the wheel while the remaining corners are extended laterally. It will be seen therefore that the studs will readily bite into the roadbed over which the wheel is traveling and prevent the wheel from slipping either in the direction of its travel or laterally.

What is claimed is:

1. A tire shield comprising outer and inner flexible bands, laterally extending wings integral with the inner band, a lining upon the inner band and its wings, parallel strips separate from and secured upon the lining and extending circumferentially within the shield, said strips being also separate from the bands and having depressions therein, rivets extending through the strips, bands and lining, for binding them together, said rivets being seated at one end within the depressions and held by the strips out of contact with the tire within the shield, and flexible means for binding the wings upon a tire.

2. A tire shield comprising outer and inner flexible bands, laterally extending wings integral with the inner band, diagonally disposed series of angular studs upon the outer band, the studs of adjoining series being disposed in alinement and the opposed corners of each stud being disposed on lines extending transversely and circumferentially of the shield respectively, tapered means extending through each stud and through the bands for securing the stud in place, a lining upon the inner band and its wings and concealing the inner ends of said tapered means, parallel strips secured upon the inner surface of the lining and extending circumferentially within the shield, said strips being separate from the lining and the bands and having depressions therein, means extending through the strips, bands, and lining for binding them together, said means being seated at one end in the depressions and held by the strips out of contact with the tire within the shield, and flexible means for binding the wings upon a tire.

In testimony that I claim the foregoing as my own, I have hereto affixed my signature in the presence of two witnesses.

JOSEPH H. FLETCHER.

Witnesses:
H. M. ESTERLY,
JOHN K. KOELNK.